(12) United States Patent
Gano

(10) Patent No.: US 9,296,274 B2
(45) Date of Patent: Mar. 29, 2016

(54) INTEGRATED SYSTEM OF INDEPENDENTLY-VARIABLE MULTI-WHEEL STEERING AND ROAD CONTACT GEOMETRY

(76) Inventor: John Victor Gano, Russin (CH)

( * ) Notice: Subject to any disclaimer, the term of this patent is extended or adjusted under 35 U.S.C. 154(b) by 0 days.

(21) Appl. No.: 14/379,619

(22) PCT Filed: Mar. 6, 2012

(86) PCT No.: PCT/EP2012/053805
§ 371 (c)(1),
(2), (4) Date: Oct. 8, 2014

(87) PCT Pub. No.: WO2013/127471
PCT Pub. Date: Sep. 6, 2013

(65) Prior Publication Data
US 2015/0028550 A1    Jan. 29, 2015

(30) Foreign Application Priority Data

Feb. 27, 2012 (CH) .................................. 251/12

(51) Int. Cl.
*B60G 17/00* (2006.01)
*B60G 3/02* (2006.01)
(Continued)

(52) U.S. Cl.
CPC ........ *B60G 17/0163* (2013.01); *B60B 33/0005* (2013.01); *B60B 33/006* (2013.01);
(Continued)

(58) Field of Classification Search
CPC .... B60G 17/0163; B60G 21/007; B60G 3/02; B60G 2300/40; B60G 2300/37; B60G 2200/46; B60G 2200/464; B60G 2200/44; B60G 2500/30; B60G 2800/962; B60G 2800/24; B60G 2204/419; B62D 9/04; B62D 7/026; B60B 33/063; B60B 33/0039; B60B 33/0005; B60B 33/006
See application file for complete search history.

(56) References Cited

U.S. PATENT DOCUMENTS 2,533,752 A * 12/1950 Alamagny ...................... 180/21
3,404,746 A * 10/1968 Slay ................................ 180/23
(Continued)

FOREIGN PATENT DOCUMENTS

CN    2078249 U    6/1991
CN    1184744      6/1998
(Continued)

OTHER PUBLICATIONS

PCT/EP2011/056380 International Search Report dated Jul. 7, 2011 (3 pages).
(Continued)

*Primary Examiner* — Drew Brown
(74) *Attorney, Agent, or Firm* — Brinks Gilson & Lione; G. Peter Nichols

(57) ABSTRACT

Wheel assembly for a vehicle includes a wheel, at least one lower suspension link and an upper attachment joint, both being able to be attached to the vehicle, the wheel being able to rotate at 360° to steer the vehicle around a pivot line positioned by said at least one lower suspension link and said upper attachment joint once attached to the vehicle, a projection of the pivot line onto a vertical projection plane comprising a vertical axis passing through a contact point between the wheel and ground defining a caster angle with said vertical axis. The caster angle can be adjusted within a predetermined range, whatever the orientation of the projection plane. A distance between the upper attachment point and the contact point between the wheel and ground in relation to the adjusted caster angle can be adjusted.

13 Claims, 4 Drawing Sheets

(51) Int. Cl.
*B62D 7/02* (2006.01)
*B60G 17/016* (2006.01)
*B60B 33/00* (2006.01)
*B60B 33/06* (2006.01)
*B60G 21/00* (2006.01)
*B62D 9/04* (2006.01)

(52) U.S. Cl.
CPC .......... *B60B33/0039* (2013.01); *B60B 33/063* (2013.01); *B60G 3/02* (2013.01); *B60G 21/007* (2013.01); *B62D 7/026* (2013.01); *B62D 9/04* (2013.01); *B60G 2200/44* (2013.01); *B60G 2200/46* (2013.01); *B60G 2200/464* (2013.01); *B60G 2204/419* (2013.01); *B60G 2300/37* (2013.01); *B60G 2300/40* (2013.01); *B60G 2400/204* (2013.01); *B60G 2500/30* (2013.01); *B60G 2800/24* (2013.01); *B60G 2800/962* (2013.01)

(56) References Cited

U.S. PATENT DOCUMENTS

| | | | |
|---|---|---|---|
| 4,213,631 A * | 7/1980 | Wilkerson | 280/86.752 |
| 5,498,018 A | 3/1996 | Wahl et al. | |
| 5,700,025 A | 12/1997 | Lee | |
| 6,024,381 A | 2/2000 | Mottola | |
| 6,094,846 A | 8/2000 | Feller | |
| 6,428,089 B1 | 8/2002 | Noda | |
| 6,796,569 B2 * | 9/2004 | Pankau | 280/124.155 |
| 7,401,794 B2 | 7/2008 | Laurent et al. | |
| 7,464,785 B2 | 12/2008 | Spark | |
| 7,744,102 B2 | 6/2010 | Bailey et al. | |
| 7,784,805 B2 * | 8/2010 | Morgan | 280/124.134 |
| 7,823,673 B2 | 11/2010 | Asogawa | |
| 8,689,914 B2 | 4/2014 | Gano et al. | |
| 2002/0047293 A1 | 4/2002 | Noda | |
| 2002/0170764 A1 | 11/2002 | Oshima et al. | |
| 2003/0122336 A1 | 7/2003 | Zadok | |
| 2006/0017248 A1 | 1/2006 | Kang | |
| 2008/0065265 A1 | 3/2008 | Ozick et al. | |
| 2008/0125938 A1 | 5/2008 | Pierpont | |
| 2009/0288904 A1 | 11/2009 | Chang | |
| 2013/0020775 A1 | 1/2013 | Beji | |
| 2013/0056288 A1 | 3/2013 | Gano et al. | |
| 2013/0098695 A1 | 4/2013 | Itou et al. | |

FOREIGN PATENT DOCUMENTS

| | | |
|---|---|---|
| CN | 201161631 | 12/2008 |
| DE | 33 33 476 | 12/1984 |
| DE | 35 33 216 | 3/1987 |
| DE | 197 54 425 | 6/1999 |
| EP | 0 983 883 | 3/2000 |
| GB | 1 062 102 | 3/1967 |
| JP | S 60151181 | 8/1985 |
| JP | 3678344 | 5/2005 |
| KR | 2007 0014782 | 2/2007 |
| WO | WO 98/19875 | 5/1998 |
| WO | WO 99/54186 | 10/1999 |
| WO | WO 00/32462 | 6/2000 |
| WO | WO 02/22428 | 3/2002 |
| WO | WO 2005/030509 | 4/2005 |
| WO | WO 2010/150286 | 12/2010 |
| WO | WO 2011/147648 | 12/2011 |
| WO | WO 2013/182222 | 12/2013 |

OTHER PUBLICATIONS

PCT/EP2012/053805 International Search Report dated Aug. 1, 2012 (3 pages).
PCT/EP2012/060502 International Search Report dated Aug. 13, 2012 (3 pages).

* cited by examiner

INTEGRATED SYSTEM OF INDEPENDENTLY-VARIABLE MULTI-WHEEL STEERING AND ROAD CONTACT GEOMETRY

This application claims priority to International Application No. PCT/EP2012/053805 filed Mar. 6, 2012 and Swiss Patent Appln. 00251/12 filed Feb. 27, 2012; the entire contents of each are incorporated herein by reference.

The present invention relates to a wheel assembly and a vehicle comprising at least two such wheel assemblies.

The document WO 2010/150286 describes a vehicle having five omni-directional wheel assemblies. Such vehicle can adjust its height by moving the wheel support but this height adjustment is done at the axle level, so that the system is complicated and the either the front or the rear side will move so that stability in curves is not improved.

The document WO 2011/147648 describes a vehicle having wheel assemblies with an adjustable caster angle. However, this solution does not completely address the lack of stability during changes of direction.

The present invention aims to solve these aforementioned drawbacks and is directed to propose first an omni-directional wheel assembly able to provide improved stability while driving along a curve or during changes of direction.

With this goal in mind, a first aspect of the invention is a wheel assembly for vehicle comprising:
  a wheel,
  at least one lower suspension link and an upper attachment joint, both being able to be attached to the vehicle,
the wheel being able to rotate at 360°, to steer the vehicle, around a pivot line positioned by said at least one lower suspension link and said upper attachment joint once attached to the vehicle,
a projection of the pivot line onto a vertical projection plane comprising a vertical axis passing through a contact point between the wheel and ground defining a caster angle with said vertical axis,
the wheel assembly comprising:
  caster adjustment means arranged to adjust the caster angle within a predetermined range, whatever the orientation of the projection plane, characterized in that the wheel assembly comprises:
  length adjustment means arranged to adjust a distance between the upper attachment point and the contact point between the wheel and ground, in relation to the adjusted caster angle.

The present invention, by proposing an adjustment of the distance between the upper adjustment point and the ground, allows an independent adjustment of the length of each wheel assembly of the vehicle so that the stability is improved, as the adjustment is performed in relation to the caster angle. The orientation of the chassis is controlled (horizontal or inclined target) so that an optimization of the passenger comfort is achieved. For example, banking of the chassis may be obtained to compensate a centrifugal force applied to the passengers during turning at higher speeds.

Advantageously, the length adjustment means adjust the distance in relation to the rotation of the wheel around the pivot line. The adjustment is done as a function of the pivoted angle, so that the stability is improved during the changes of direction.

Advantageously, the wheel assembly comprises a suspension mean arranged between the upper attachment joint and the lower suspension link, and the length adjustment means are arranged between the wheel and the lower suspension link. This embodiment provides a low center of gravity to the assembly.

Ideally, the length adjustment means are electrically powered.

As an alternative, the length adjustment means are pneumatically powered.

As an alternative, the length adjustment means are hydraulically powered.

The invention is also related to a vehicle comprising at least one wheel assembly according to the first aspect of the invention, wherein the wheel of said at least one wheel assembly defines a track with another wheel of the vehicle and wherein the track is adjusted by an adjustment of the adjustable distance of said at least one wheel assembly, in relation to the caster angle. The present invention provides an additional effect at the vehicle level, as the combination of the caster angle adjustment and the length adjustment result in an increased change of the track width, so that the stability is more improved.

Advantageously, the wheel of said wheel assembly occupies a longitudinal position on the vehicle and the longitudinal position is adjusted by an adjustment of the adjustable distance of said at least one wheel assembly, in relation to the caster angle. The longitudinal position of the wheel is changed to improve the agility of the vehicle.

The invention is also related to a process for stabilizing of a vehicle in motion comprising at least two wheels defining a track and belonging to wheel assemblies each:
  having a pivot line,
  presenting an adjustable caster angle, and
  an adjustable distance between an upper attachment point and the ground, the process comprising the steps of:
  steering the vehicle into a direction by turning each wheel around its pivot line by a steering angle;
  adjusting the caster angle of each wheel assembly in relation to the steering angles;
  adjusting the track in relation to the steering angles by changing the adjustable distance.

The process according to the invention leads to an improved stability of the vehicle as the track width is changed while the vehicle is driving along a curve.

Advantageously, the process comprises a step of adjusting the longitudinal position on the vehicle of said at least two wheels, in relation to the steering angles, by changing the adjustable distance. The agility of the vehicle during the changes of direction is improved.

Advantageously, the change of direction defines an instantaneous center of rotation common to the at least two wheels and located on one side of the vehicle,
and the step of adjusting the track comprises the steps of:
  decreasing the adjustable distance of the wheel assembly being between the vehicle and the instantaneous center of rotation
  increasing the adjustable distance of the wheel assembly being opposite to the instantaneous center of rotation in regards to the vehicle.
This embodiment provides the ability for the vehicle to actively withstand the centrifugal forces applied to the vehicle body during the change of direction.

Ideally, the process comprises a step of measurement of the speed of the vehicle, and the step of adjusting the track is performed in relation to the speed of the vehicle.

Ideally, the process comprises a step of adjusting an orientation of the vehicle chassis relative to a horizontal plane, by changing the adjustable distance. The invention provides a stable orientation of the chassis if the road orientation changes. It is now possible to compensate a slope or a transverse inclination of the road, resulting in an improved comfort for the passengers.

Other characteristics and advantages of the present invention will appear more clearly from the following detailed description of particular non-imitative examples of the invention, illustrated by the appended drawings where:

Figure 1:
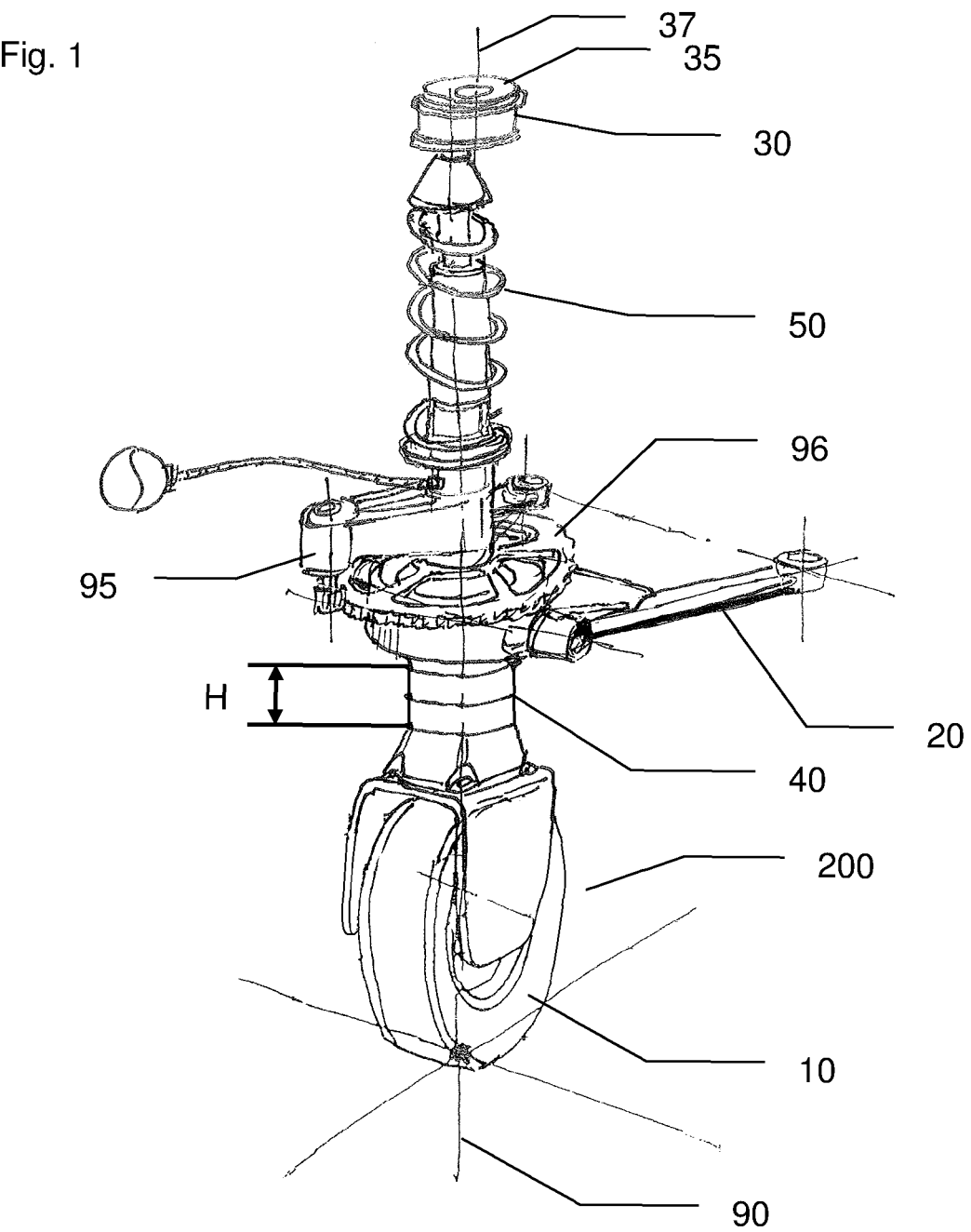
FIG. 1 represents a perspective view of a wheel assembly according to the invention.

The wheel assembly represented at FIG. 1 comprises a wheel 10 that is arranged to rotate around a pivot line 90, in response to a command from an electric drive 95 engaged with a gear 96. The wheel assembly is arranged to be attached to a vehicle between the upper attachment joint 30 and the lower suspension arm 20. The wheel assembly is equipped with caster angle adjustment means 37 which are arranged to adjust the caster angle of the wheel assembly by a rotation of the part 35 around the axis 37, which is arranged at a specific distance from the pivot line 90. The rotation of this eccentric part 35 may be controlled by an electric motor, not represented. This arrangement allows an adjustment of the caster angle whatever the rotation of the wheel around the pivot line is. The wheel assembly comprises suspension means 50 and also comprises length adjustment means 40 arranged to adjust the length H in relation to various parameters, as detailed in the following paragraphs. The wheel 10 may be powered by one electric motors not shown, mounted at the top of the wheel assembly.

Figure 2:
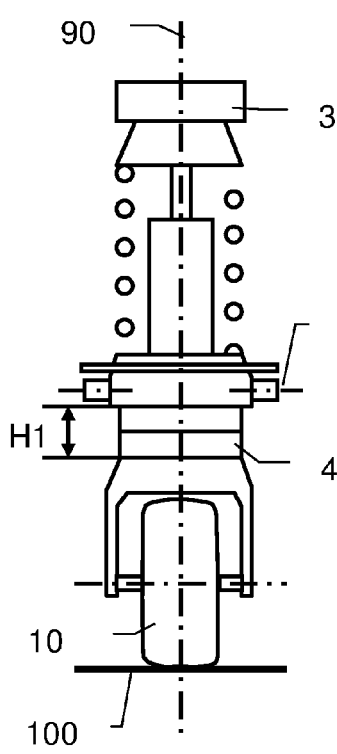
FIG. 2 represents a front view of the wheel assembly of FIG. 1 during straight forward driving conditions, at a first length configuration.

FIG. 2 shows a front view of the wheel assembly of FIG. 1 during straight forward driving conditions, at a first length configuration. The length adjustment means 40 have been set at a minimum length H1.

Figure 3:
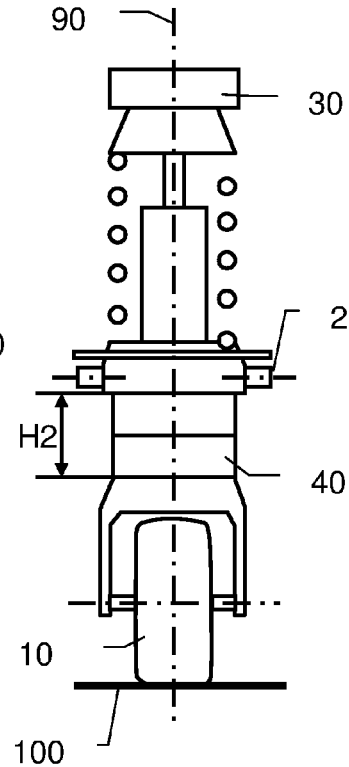
FIG. 3 represents a front view of the wheel assembly of FIG. 1 during straight forward driving conditions, at a second length configuration.

FIG. 3 shows a front view of the wheel assembly of FIG. 1 during straight forward driving conditions, at a second length configuration. The length adjustment means 40 have been set at a medium length H2.

Figure 4:
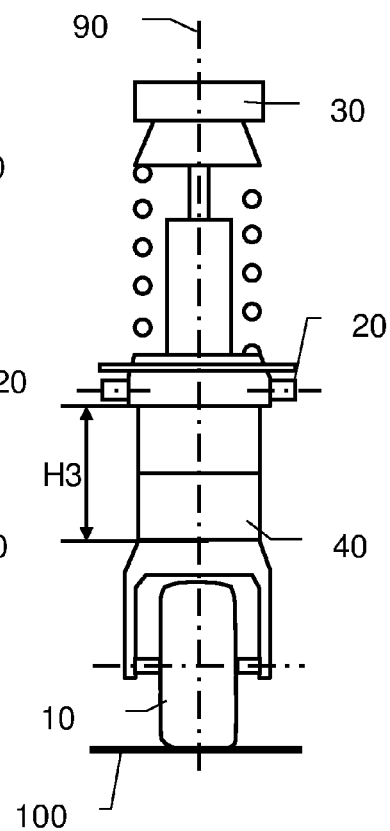
FIG. 4 represents a front view of the wheel assembly of FIG. 1 during straight forward driving conditions, at a third length configuration.

FIG. 4 shows a front view of the wheel assembly of FIG. 1 during straight forward driving conditions, at a third length configuration. The length adjustment means 40 have been set at a high length H2.

Figure 5:
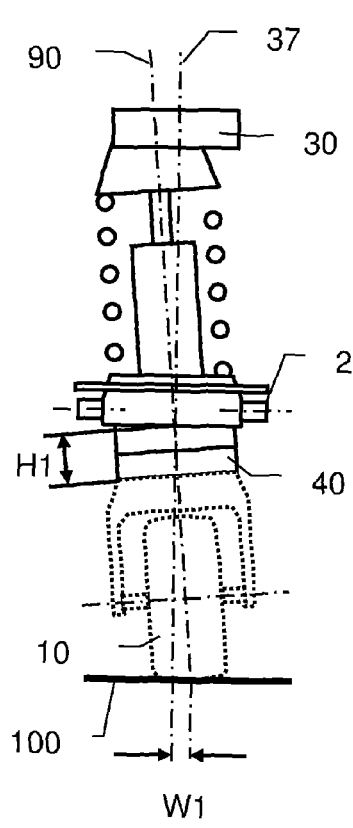
FIG. 5 represents a front view of the wheel assembly of FIG. 1 by driving along a curve, at a first length configuration.

FIG. 5 represents a front view of the wheel assembly of FIG. 1 by driving along a curve, at the first length configuration. In the aim to drive along a curve, the wheel 10 is rotated around the pivot line 90. Only a section of the wheel 10 is shown in dotted line, as well as the fork that is also rotated. In the same time, the caster angle is adjusted by the caster adjustment means 37 by a rotation of the eccentric part 35. A lateral movement W1 of the wheel 10 is simultaneously obtained.

Figure 6:
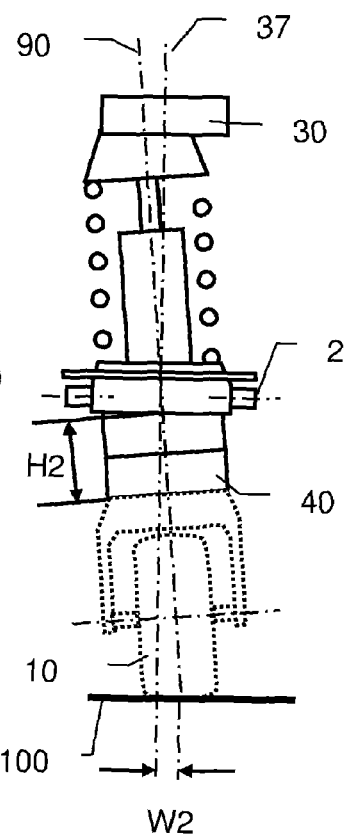
FIG. 6 represents a front view of the wheel assembly of FIG. 1 by driving along a curve, at a second length configuration.

FIG. 6 represents a front view of the wheel assembly of FIG. 1 by driving along a curve, at the second length configuration. In order to compensate an inclination of the road or to improve the stability along the curve, the length adjustment means 40 are elongated to the second length H2, so that a greater transverse displacement W2 of the wheel 10 is obtained. The track is enlarged compared to the first length W1 of FIG. 5.

Figure 7:
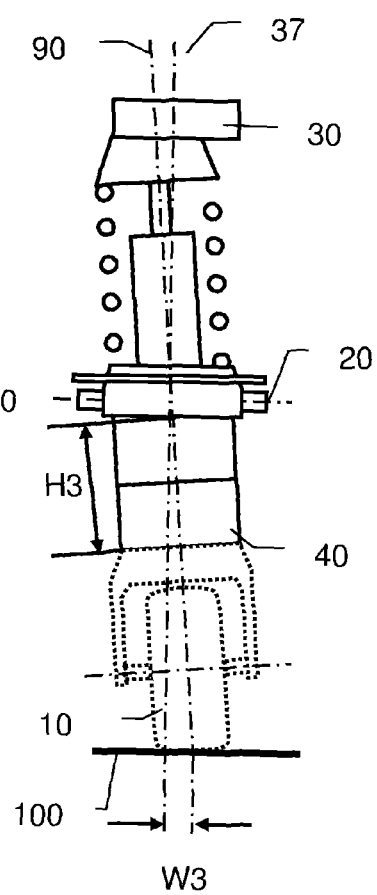
FIG. 7 represents a front view of the wheel assembly of FIG. 1 by driving along a curve, at a third length configuration.

FIG. 7 represents a front view of the wheel assembly of FIG. 1 by driving along a curve, at a third length configuration. In the aim to obtain the highest stability of the vehicle, the length adjustment means 40 are elongated at the maximum length H3, so that a maximum transverse displacement W3 of wheel 10 is achieved.

Figure 8:
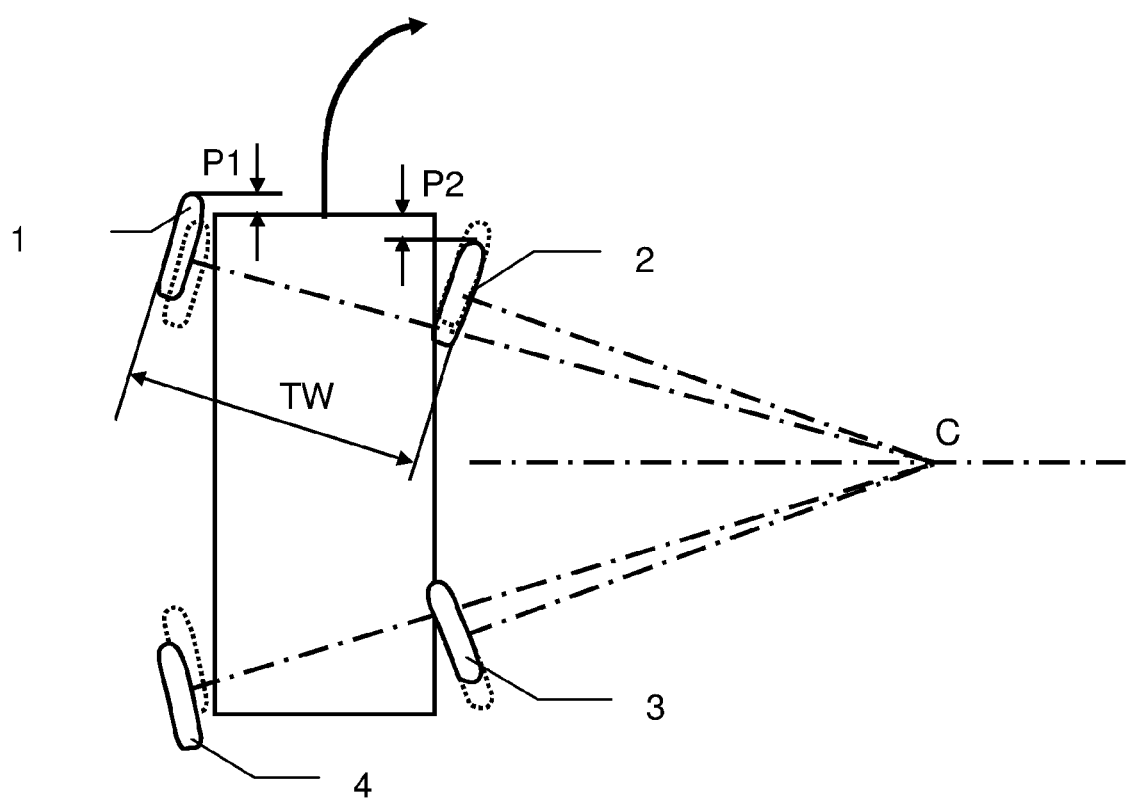
FIG. 8 represents a top view of a vehicle in motion along a curve comprising 4 wheel assemblies according to the present invention.

FIG. 8 represents a top view of a vehicle in motion along a curve comprising 4 wheel assemblies according to the present invention. The vehicle is equipped with four wheel assemblies 1, 2, 3, 4 and is shown during a change of direction. An instantaneous center of rotation C is represented with the turning radiuses attached to each steering wheel. The length adjustment means are controlled so that the transverse and longitudinal position of each wheel is adjusted, in relation to the caster adjusted angle. The positions occupied by the wheel are shown in solid lines, and the dotted lines show the position that the wheels would occupy without the invention. It should be noticed that the outer wheels are moved so that their respective distance is enlarged and the inner wheels are moved so that their respective distance is reduced. The track width is also enlarged. This results in an improved stability and agility of the vehicle driving along a curve.

It is understood that obvious improvements and/or modifications for one skilled in the art may be implemented, being under the scope of the invention as it is defined by the appended claims.

The invention claimed is:

1. A wheel assembly for vehicle comprising:
    a wheel,
    at least one lower suspension link and an upper attachment joint, both being able to be attached to the vehicle, the wheel being able to rotate at 360°, to steer the vehicle around a pivot line positioned by said at least one lower suspension link and said upper attachment joint once attached to the vehicle,
    a projection of the pivot line onto a vertical projection plane comprising a vertical axis passing through a contact point between the wheel and ground defining a caster angle with said vertical axis,
    caster adjustment means arranged to adjust the caster angle within a predetermined range, whatever the orientation of the projection plane,
    length adjustment means arranged to adjust a distance between the upper attachment point and the contact point between the wheel and ground in relation to the adjusted caster angle.

2. The wheel assembly according to claim 1 wherein the length adjustment means adjusts the distance in relation to the rotation of the wheel around the pivot line.

3. The wheel assembly according to claim 1 further comprising a suspension arranged between the upper attachment joint and the lower suspension link, and wherein the length adjustment means are arranged between the wheel and the lower suspension link.

4. The wheel assembly according to claim 1 wherein the length adjustment means are electrically powered.

5. The wheel assembly according to claim 1 wherein the length adjustment means are pneumatically powered.

6. The wheel assembly according to claim 1 wherein the length adjustment means are hydraulically powered.

7. A vehicle comprising at least one wheel assembly according to claim 1, wherein the wheel of said at least one wheel assembly defines a track with another wheel of the vehicle and wherein the track is adjusted by an adjustment of the adjustable distance of said at least one wheel assembly in relation to the caster angle.

8. A vehicle according to claim 7, wherein the wheel of said wheel assembly occupies a longitudinal position on the vehicle and wherein the longitudinal position is adjusted by an adjustment of the adjustable distance of said at least one wheel assembly in relation to the caster angle.

9. A process for stabilizing of a vehicle in motion comprising at least two wheels defining a track and belonging to wheel assemblies each:
   having a pivot line,
   including one of the at least two wheels and being able to rotate at 360° to steer the vehicle around the pivot line,
   presenting an adjustable caster angle, and
   an adjustable distance between an upper attachment point and the ground,
   the process comprising the steps of:
   steering the vehicle into a direction by turning each wheel around its pivot line by a steering angle;
   adjusting the caster angle of each wheel assembly in relation to the steering angles; and
   adjusting the track in relation to the steering angles by changing the adjustable distance.

10. A process according to claim 9, comprising a step of adjusting the longitudinal position on the vehicle of said at least two wheels, in relation to the steering angles by changing the adjustable distance.

11. A process according to claim 9, wherein the change of direction defines an instantaneous center of rotation common to the at least two wheels and located on one side of the vehicle,
   and wherein the step of adjusting the track comprises the steps of:
   decreasing the adjustable distance of the wheel assembly being between the vehicle and the instantaneous center of rotation;
   increasing the adjustable distance of the wheel assembly being opposite to the instantaneous center of rotation in regards to the vehicle.

12. A process according to claim 9, comprising a step of measurement of the speed of the vehicle, and wherein the step of adjusting the track is performed in relation to the speed of the vehicle.

13. A process according to claim 9, comprising a step of adjusting an orientation of the vehicle chassis relative to a horizontal plane, by changing the adjustable distance.

* * * * *